Oct. 6, 1936.  J. S. EDWARDS  2,056,262

TRACTOR AND TRAILER COUPLING

Filed Dec. 14, 1935   2 Sheets-Sheet 1

INVENTOR.
John S. Edwards
BY
ATTORNEY.

Oct. 6, 1936.  J. S. EDWARDS  2,056,262

TRACTOR AND TRAILER COUPLING

Filed Dec. 14, 1935    2 Sheets—Sheet 2

INVENTOR.
John S. Edwards
BY
ATTORNEY.

Patented Oct. 6, 1936

2,056,262

UNITED STATES PATENT OFFICE 2,056,262

TRACTOR AND TRAILER COUPLING

John S. Edwards, South Bend, Ind., assignor to Edwards Iron Works, Incorporated, South Bend, Ind., a corporation of Indiana Application December 14, 1935, Serial No. 54,389

12 Claims. (Cl. 280—33.1)

This invention relates to trailer couplings and particularly to means enabling the close coupling of tractor and trailer units whereby the effective carrying capacity in relation to the overall length of the trailer-tractor combination is materially increased.

One of the primary objects of my invention is to provide a tractor-trailer coupling by which the trailer body is maintained close to the tractor cab and which will permit the tractor to move out of alignment with the trailer.

Another object is to provide a tractor-trailer coupling whereby the trailer is moved axially relative to the tractor upon the turning of the tractor out of alignment with the trailer.

Another object is to provide a coupling comprising a fifth wheel carried by the tractor and a king pin adapted to be locked therein carried by the trailer, the king pin being movable in a predetermined arc relative to the trailer upon the turning of the tractor out of alignment with the trailer to provide turning clearances therebetween.

Still another object is to provide a coupling comprising a fifth wheel carried by the tractor and a king pin carried by a member pivotally supported by the trailer adapted to be locked in said fifth wheel, the member being movable in a predetermined path upon the turning of the tractor out of alignment with the trailer to provide turning clearances therebetween.

Other objects, and objects relating to details of construction and methods of operation will be apparent from the drawings and the detailed description to follow.

In the accompanying drawings in which like numerals refer to like parts throughout the several views and in which the sectional views are taken looking in the direction of the arrows:

Figure 8:
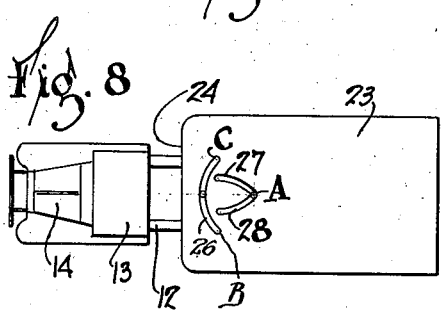
Figure 9:
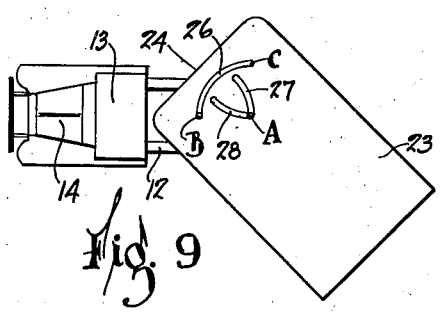
Figure 10:
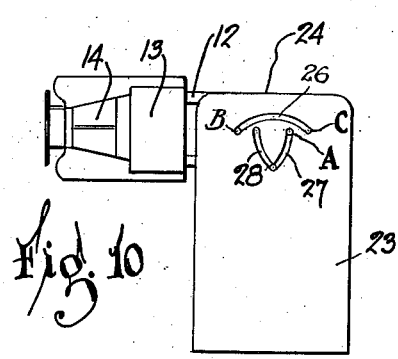

Figs. 8, 9, and 10 are diagrammatic plan views of a tractor and trailer illustrating the turning clearance provided by my coupling device.

The present coupling devices employed for connecting a semi-trailer with the tractor, or for connecting one trailer with another, necessitates that considerable space must be provided therebetween to provide adequate clearance in turning so that the trailer body will clear the tractor cab. To overcome the objection of spacing the trailer body a considerable distance from the tractor cab some of the manufacturers have rounded the entire front end of the trailer body in order to provide the close coupling but such practice is objectionable since the carrying capacity of the trailer body is materially reduced. The present invention provides a marked improvement in overcoming the objections which have heretofore been present as I am enabled to use a trailer body having a flat front end which may be coupled close to the tractor cab and at the same time permit turning of the tractor out of alignment with the trailer as is clearly illustrated in the drawings.

Referring to the drawings which are to be taken as illustrative only and not as limiting the scope of my invention, I have shown a tractor 10 having driving wheels 11, a frame 12, a cab 13, and an engine mounted within the hood 14. The truck or tractor may be of any approved design and does not require any additional or different parts from tractors now on the market to incorporate my invention therewith so that a further description of the same is not thought necessary.

A fifth wheel referred to generally by the numeral 15 is pivotally supported at 16 on the tractor frame 12. The fifth wheel illustrated may be like that shown in my Patent No. 1,922,359 issued August 15, 1933, and includes a bolster or top plate 17 having a rearwardly sloping face 18 and having a slot 19 therein. The king pin is locked in the fifth wheel 15 by the locking mechanism 20 fully illustrated in my patent referred to above. As my invention may be used in connection with the fifth wheel like that shown in my Patent No. 1,922,359 issued August 15, 1933, or with any of the several fifth wheels now on the market which include a member for locking the fifth wheel therein, a further description of the fifth wheel construction is not thought necessary.

The trailer which is illustrated as a semi-trailer unit comprises a frame 21 supported at its rear by wheels 22 having a body 23 mounted thereon which body preferably has a flat front end 24 adapted to be mounted close to the cab 13.

Figure 1:
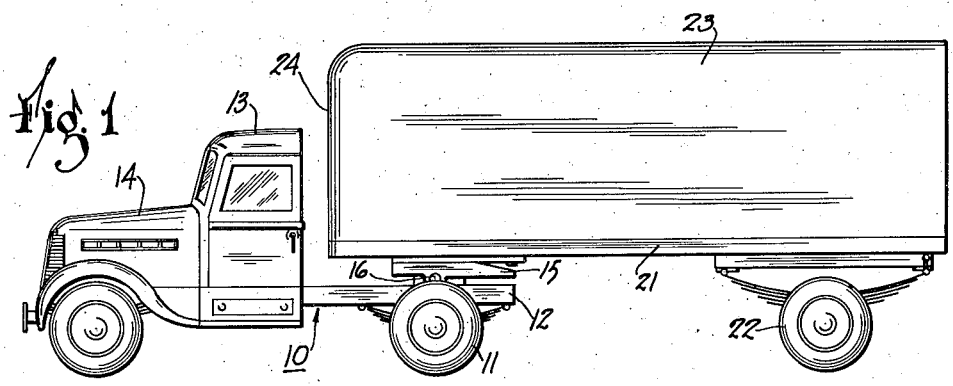
Fig. 1 is a side elevational view of a tractor and trailer having my invention applied thereto.
Figure 2:
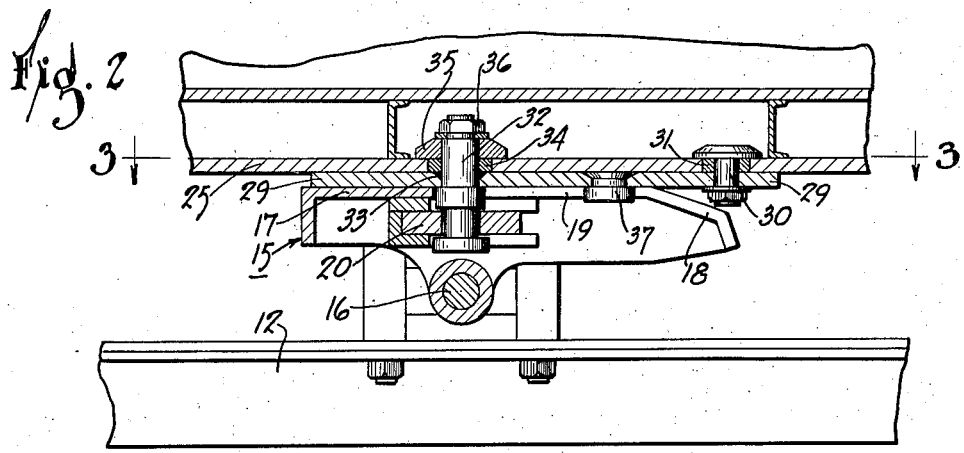
Fig. 2 is a detailed sectional view taken on the line 2—2 of Fig. 3 showing the fifth wheel, a portion of the trailer frame and coupling device therebetween.
Figure 3:
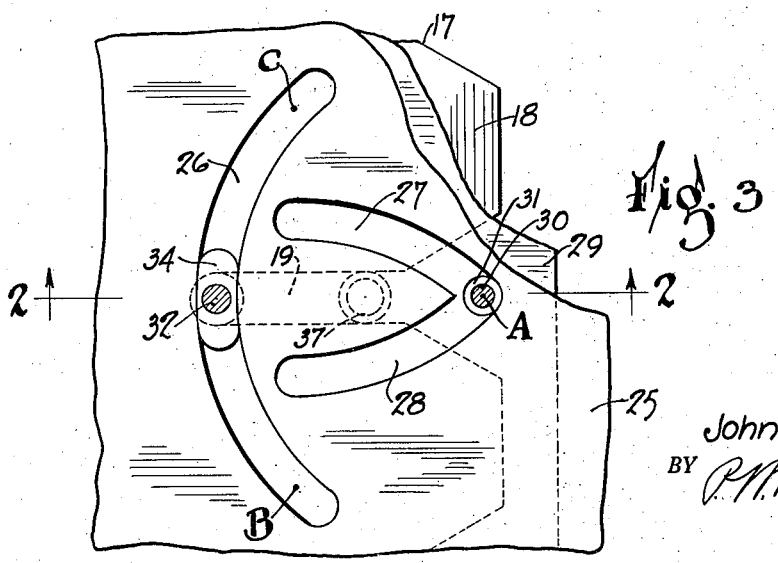
Fig. 3 is a detailed sectional view taken on the line 3—3 of Fig. 2 showing a portion of the trailer frame, the king pin and the fifth wheel, the truck and trailer being in alignment.

Referring particularly to Figs. 2 and 3 the trailer frame 21 includes a bottom plate 25 having an arcuate slot 26 therein and also arcuate slots 27 and 28 therein in spaced relationship to the slot 26 for a purpose to be hereinafter described. A plate 29 is positioned beneath the bottom plate 25 which is adapted to seat on the fifth wheel 15 and has a pivot pin 30 extending therethrough adapted to ride in either of the slots 27 or 28 formed in the bottom plate 25, upon the turning of the tractor relative to the trailer. To permit easy movement of the pin 30 in either of the slots 27 or 28 I provide a bushing 31 surrounding the pin 30 as is best illustrated in Fig. 2.

Figure 7:
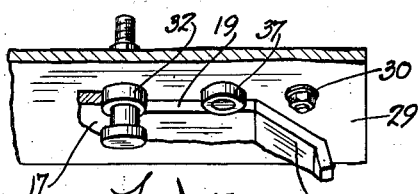
Fig. 7 is a perspective view of the king pin, its supporting plate and a portion of the fifth wheel in operative relation thereto.

A king pin 32 suitably secured in the member 29 as, for example, by being welded therein at 33 has a downwardly extending portion adapted to be locked in the fifth wheel 15 by the locking member 20 and extends upwardly through the arcuate slot 26 formed in the trailer bottom plate 25. I preferably provide a shoe 34 on the king pin 32 to slide in the arcuate slot 26 and I also provide a washer 35 on the upper end thereof secured in position by the nut 36 so that the member 29 carrying the king pin 32 is maintained in assembled position on the bottom of the trailer plate 25 at one end and by the pin 30 at the opposite end thereof. A stop or guide member 37 is secured in and extends downwardly from the member 29 to seat in the slot 19 formed in the bolster plate 17 of the fifth wheel as is best shown in Figs. 2 and 7 so that the member 29 is at all times maintained in axial alignment with the fifth wheel 15. It will also be observed that the king pin 32, the stop 37 and the pin 30 are in alignment for a purpose to be hereinafter described.

Referring particularly to Fig. 3 in which the tractor and trailer are in alignment, the pin 30 is positioned at the junction of the arcuate slots 27 and 28 formed in the trailer bottom plate 25 and the king pin 32 is midway between the ends of the arcuate slot 26, the pin 37 seating between the edges of the slot 19 formed in the bolster plate 17 of the fifth wheel 15.

The arcuate slot 26 is formed on radii projecting from the point A shown in Fig. 3, the slot 27 is formed on radii projecting from the point B, and the slot 28 is formed on radii projecting from the point C. The point A is the axis of the pin 30 at the junction of the slots 27 and 28. The point B is the axis of the king pin 32 when the tractor is turned to the extreme left-hand position and the point C is the axis of the king pin when the tractor is turned to the extreme right hand position, or when the tractor has been turned at an angle of 90° relative to the trailer as illustrated in Fig. 10.

Figure 4:
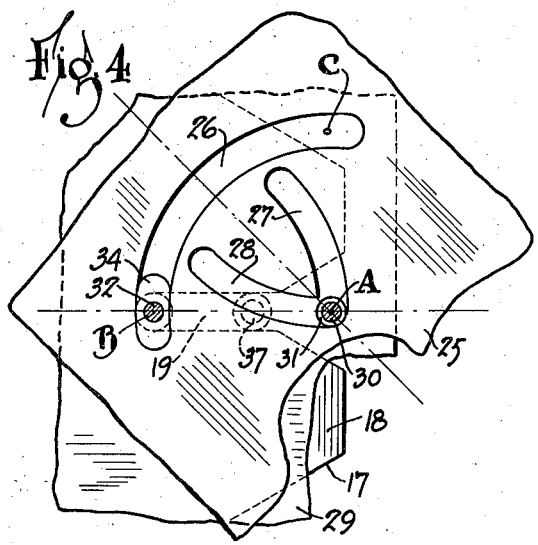
Fig. 4 is a view similar to Fig. 3 showing the positions assumed by the parts forming the coupling with the truck turned substantially 45° relative to the trailer.
Figure 5:
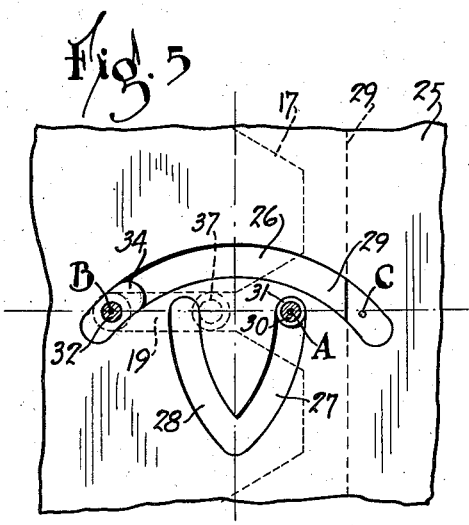
Fig. 5 is view similar to Figs. 3 and 4 showing the tractor turned 90° relative to the trailer.
Figure 6:
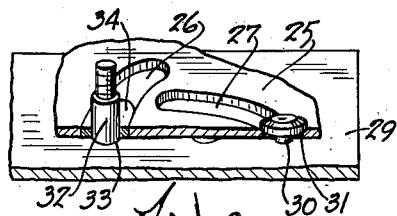
Fig. 6 is a fragmentary perspective view of the trailer bottom plate, the king pin and its supporting member.

Upon the turning of the tractor 10 out of alignment with the trailer to the left, the plate 29 will pivot about the point A whereby the king pin 32 will move toward the point B which will permit the tractor to turn substantially 45° relative to the trailer as shown in Figs. 4 and 9, and upon further turning movement of the tractor relative to the trailer the king pin then will form a pivot at the point B and the pin 30 will travel forwardly in the slot 27 to permit the tractor to turn a total of a full 90° relative to the trailer. When it is desired to turn the tractor 10 to the right relative to the trailer from the position shown in Fig. 3, the plate 29 will pivot about the point A and the king pin 32 will travel to the right in the arcuate slot 26 to the point C or to substantially 45° relative to the trailer and on further turning movement of the tractor relative to the trailer, the king pin 32 will form a pivot at the point C so that the pin 30 will travel forwardly in the slot 28 to permit the tractor turning a full 90° relative to the trailer, or in the position opposite to that shown in Fig. 10.

As the arcuate slot 26 is radiated from the point A as shown in Fig. 3, which is positioned rearwardly of the king pin 32, and as the tractor pivots about the point A during the initial turning of the tractor relative to the trailer, the front end of the trailer body may be positioned closer to the cab than in the prior constructions in which the king pin comprises the turning pivot. My improved coupling arrangement is diagrammatically shown in Figs. 8, 9, and 10, which show that a trailer body of standard width can be mounted relatively close to the cab and yet provide ample turning clearance so that the tractor may be turned 90° relative to the trailer.

While I have shown and described one embodiment of my invention, the same is to be taken as illustrative only as various changes in details of construction and methods of operation may be employed to those skilled in the art without departing from the spirit and substance of my invention, the scope of which is to be measured only by the sub-joined claims.

What I claim is:

1. In combination with a tractor having a fifth wheel member thereon and a trailer having one end supported thereby, of a coupling device comprising, a plate having at least two arcuate slots in spaced relationship therein supported by said trailer, a member having a pin thereon extending through and movable in one of said slots, and a king pin supported by said member adapted to be locked in said fifth wheel and movable in the other of said slots whereby a close coupling is provided and turning clearance is permitted when said tractor is turned out of alignment with said trailer.

2. In combination with a tractor having a fifth wheel member thereon and a trailer having one end supported thereby, of a coupling device comprising, a plate supported by said trailer having at least two arcuate slots in spaced relationship therein, a member having a pin thereon extending through and movable in one of said slots, a king pin supported by said member adapted to be locked in said fifth wheel movable in the other of said slots, and a stop carried by said member engageable with said fifth wheel maintaining said member in alignment with said fifth wheel whereby a close coupling is provided and turning clearance is permitted when said tractor is turned out of alignment with said trailer.

3. In combination with a tractor having a fifth wheel member thereon and a trailer having a king pin supported thereby adapted to be locked in said fifth wheel member, of a coupling device comprising, a trailer plate having an arcuate slot therein, a member pivotally supported by said plate rearwardly of said king pin, said king pin being supported by said member and movable in said slot to provide a close coupling and permitting turning clearance when said tractor is turned out of alignment with said trailer.

4. In combination with a tractor having a fifth wheel member thereon and a trailer supported thereby, of a coupling device comprising, a trailer plate having at least two arcuate slots in spaced relationship therein, a member supported by said plate and interposed between said plate and said fifth wheel, a pin on said member movable in one of said slots, and a king pin supported by said member adapted to be locked in said fifth wheel and movable in the other of said slots, said king pin moving in said slot upon initial turning of said tractor relative to said trailer, and said king pin forming a pivot causing said pin to travel in the said other slot to permit further turning of said tractor relative to said trailer.

5. In combination with a tractor having a fifth wheel member thereon and a trailer supported thereby, of a coupling device comprising, a member supported by said trailer maintained in axial alignment with said fifth wheel, a king pin supported by said member adapted to be locked in said fifth wheel, means to permit said king pin to travel in an arc relative to said trailer during initial turning of said tractor relative to said trailer, said king pin forming a pivot to permit further turning of said tractor relative to said trailer.

6. A tractor-trailer coupling comprising, a fifth wheel member supported by said tractor, a king pin adapted to be locked therein, a member supporting said king pin and supported by said trailer maintained in axial alignment with said fifth wheel, means to permit said king pin to bodily move relative to said trailer upon initial turning of said tractor, said king pin forming a pivot to permit further turning of said tractor relative to said trailer.

7. A tractor-trailer coupling comprising, a fifth wheel member supported by said tractor, a king pin adapted to be locked therein, a member supporting said king pin and supported by said trailer maintained in axial alignment with said fifth wheel, a trailer plate having an arcuate slot therein receiving said king pin to permit travel thereof upon initial turning of said truck, a second slot in said plate, and a pin supported by said member extending into said second slot, said king pin forming a pivot to cause said pin to travel in said second slot to permit further turning of said tractor relative to said trailer.

8. A tractor-trailer coupling comprising, a fifth wheel member supported by said tractor, a king pin adapted to be locked therein, a member supporting said king pin and supported by said trailer, means to cause said king pin and member to travel in a predetermined path in relation to said trailer upon initial turning of said tracor, and means to cause said member to travel in a second predetermined path in relation to said trailer to permit further turning of said tractor relative to said trailer.

9. A coupling for wheeled vehicles of the overlapping tractor and trailer type comprising, a fifth wheel member supported by the tractor, a member supported by the trailer, a king pin supported by said member adapted to be locked in said fifth wheel member, and a pin on said member, said pin forming a pivot causing said king pin to travel in an arc a predetermined distance and said king pin then forming a pivot causing said pin to travel a predetermined distance to provide turning clearance between the tractor and trailer.

10. In combination with a tractor having a fifth wheel member thereon, and a trailer having a king pin supported thereby adapted to be locked in said fifth wheel member, of a coupling device comprising, a member pivotally supported by said trailer rearwardly of said king pin, said king pin being supported by said member and movable in an arc relative to said trailer whereby a close coupling is provided and turning clearance is permitted when said tractor is turned out of alignment with said trailer.

11. A tractor-trailer coupling comprising, a fifth wheel member supported by said tractor, a king pin adapted to be locked therein, a member maintained in axial alignment with said fifth wheel supporting said king pin and supported by said trailer, a trailer bottom plate having a plurality of slots therein, said king pin moving in one of the said slots upon initial turning of said tractor and a pin supported by said member extending through another of said slots in said trailer plate and movable therein to permit further turning of said tractor relative to said trailer.

12. A tractor-trailer coupling comprising, a fifth wheel member supported by said tractor, a member supported by said trailer, a king pin supported by said member adapted to be locked in said fifth wheel member, a pin on said member engageable with said fifth wheel member, said king pin and pin maintaining said member in axial alignment with said fifth wheel member, a trailer bottom plate having a plurality of slots therein, and a pin supported by said member extending through another of said slots in said trailer plate and movable therein to permit further turning of said tractor relative to said trailer.

JOHN S. EDWARDS.